(12) United States Patent
Weigand et al.

(10) Patent No.: US 7,379,215 B1
(45) Date of Patent: May 27, 2008

(54) PARALLEL SCANNING AND PROCESSING SYSTEM

(75) Inventors: Gilbert G. Weigand, Ashburn, VA (US); Paul R. Klamer, La Canada, CA (US); Christopher J. Cookson, Studio City, CA (US)

(73) Assignee: Warner Bros. Entertainment, Inc., Burbank, CA (US)

( * ) Notice: Subject to any disclaimer, the term of this patent is extended or adjusted under 35 U.S.C. 154(b) by 936 days.

(21) Appl. No.: 10/330,545

(22) Filed: Dec. 30, 2002

Related U.S. Application Data (60) Provisional application No. 60/408,881, filed on Sep. 9, 2002.

(51) Int. Cl.
  *H04N 1/40* (2006.01)
(52) U.S. Cl. .................... 358/302; 358/296; 348/96
(58) Field of Classification Search ............... 358/296, 358/300–302, 1.9; 348/96–112
  See application file for complete search history.

(56) References Cited

U.S. PATENT DOCUMENTS

| | | | |
|---|---|---|---|
| 4,872,160 A | 10/1989 | Hemmady et al. | |
| 5,014,125 A | 5/1991 | Pocock et al. | |
| 5,392,071 A | 2/1995 | Richards et al. | |
| 5,557,322 A * | 9/1996 | Millward | 348/100 |
| 5,649,046 A | 7/1997 | Stewart et al. | |
| 5,666,215 A | 9/1997 | Fredlund et al. | |
| 5,687,011 A | 11/1997 | Mowry | |
| 5,778,187 A | 7/1998 | Monteiro et al. | |
| 5,799,002 A | 8/1998 | Krishnan | |
| 5,859,951 A | 1/1999 | Aihara et al. | |
| 5,867,502 A | 2/1999 | Chang | |
| 5,935,245 A | 8/1999 | Sherer | |
| 5,946,614 A | 8/1999 | Robbins et al. | |
| 5,973,722 A | 10/1999 | Wakai et al. | |
| 5,983,005 A | 11/1999 | Monteiro et al. | |
| 6,011,782 A | 1/2000 | DeSimone et al. | |
| 6,075,887 A | 6/2000 | Brett | |
| 6,097,720 A | 8/2000 | Araujo et al. | |
| 6,119,163 A | 9/2000 | Monteiro et al. | |
| 6,141,336 A | 10/2000 | Bauchot et al. | |
| 6,151,632 A | 11/2000 | Chaddha et al. | |
| 6,157,435 A | 12/2000 | Slater et al. | |
| 6,157,635 A | 12/2000 | Wang et al. | |
| 6,189,039 B1 | 2/2001 | Harvey et al. | |
| 6,195,680 B1 | 2/2001 | Goldszmidt et al. | |

(Continued)

OTHER PUBLICATIONS

Choi et al., Design of a Flexible Open Platform for High Performance Active Networks, 1999, St. Louis, Missouri.

(Continued)

*Primary Examiner*—Thomas D. Lee
*Assistant Examiner*—Stephen Brinich
(74) *Attorney, Agent, or Firm*—Fish & Richardson P.C.

(57) ABSTRACT

Film may be scanned by routing a film from a reel through two or more scanning systems, scanning the film in parallel using the scanning systems, and creating a scanning operation dataset from the output of the scanning systems. A film scanner may include a multiple image scanning platform that creates a scanning operation dataset based on a single concurrent scanning operation of multiple images in a reel of film, and a scanning controller structured and arranged to control scanning operations, where each scanning operation involves at least one image and at least one multiple image scanning platform.

45 Claims, 6 Drawing Sheets

U.S. PATENT DOCUMENTS

| | | |
|---|---|---|
| 6,198,477 B1 | 3/2001 | Kurtze et al. |
| 6,223,211 B1 | 4/2001 | Hamilton et al. |
| 6,259,701 B1 | 7/2001 | Shur et al. |
| 6,269,217 B1 | 7/2001 | Rodriguez |
| 6,363,075 B1 | 3/2002 | Huang et al. |
| 6,363,429 B1 | 3/2002 | Ketcham |
| 6,381,608 B1 | 4/2002 | Savoie |
| 6,415,312 B1 | 7/2002 | Boivie |
| 6,434,622 B1 | 8/2002 | Monteiro et al. |
| 6,445,874 B1 | 9/2002 | Catlow |
| 6,490,285 B2 | 12/2002 | Lee et al. |
| 6,646,754 B1 | 11/2003 | Redd et al. |
| 6,674,923 B1 | 1/2004 | Shih et al. |
| 6,735,776 B1 | 5/2004 | Legate |
| 6,771,323 B1 | 8/2004 | Dean et al. |
| 6,839,803 B1 | 1/2005 | Loh et al. |
| 6,956,967 B2 | 10/2005 | Gindele et al. |
| 7,174,560 B1 | 2/2007 | Crinon |
| 7,197,715 B1 | 3/2007 | Valeria |
| 2002/0080409 A1* | 6/2002 | Keyes et al. ........ 358/302 |
| 2003/0033220 A1 | 2/2003 | Slater et al. |

OTHER PUBLICATIONS

Keller et al., An Active Router Architecture for Multicast Video Distribution, St. Louis, Missouri.

Lockwood et al., Reprogrammable Network Packet Processing on the Field Programmable Port Extender (FPX), 2001, St. Louis, Missouri.

Taylor et al., Dynamic Hardware Plugins (DHP): Exploiting Reconfigurable Hardware for High-Performance Programmable Routers, 2002, St. Louis, Missouri.

PCT International Search Report for Application No. PCT/US02/41769, Apr. 8, 2003, 6 pages.

Office Action for U.S. Appl. No. 10/334,430, Mar. 6, 2006, 14 pages.

Office Action for U.S. Appl. No. 10/284,461, May 6, 2005, 9 pages.

Office Action for U.S. Appl. No. 10/284,461, Jan. 19, 2006, 9 pages.

Office Action for U.S. Appl. No. 10/284,461, Jul. 12, 2006, 10 pages.

* cited by examiner

PARALLEL SCANNING AND PROCESSING SYSTEM

CROSS-REFERENCE TO RELATED APPLICATIONS

This application claims priority to U.S. Provisional Application No. 60/408,881, titled "Parallel Scanning, Processing and Realignment System" and filed Sep. 9, 2002; and U.S. application Ser. No. 10/284,461, titled "Post-production Processing" and filed Oct. 31, 2002. Each of these applications is incorporated by reference in its entirety.

TECHNICAL FIELD

This document relates to post-production film processing, and more particularly to film scanning.

BACKGROUND

Post production systems often are used to turn a film into a media product that is appropriate for distribution or to convert a film-based motion picture into a digital format that is appropriate for storage and preservation. One piece of equipment that may be incorporated by post production systems is a scanning system that is used to create digital images from a motion picture film. The Digital image produced by a scanning system may be written to any of several media formats for distribution or storage. For example, a classic movie could be digitally re-released on DVD. Thus, scanning systems may serve as a gateway to other devices in the post-production process.

SUMMARY

In one aspect, film may be scanned in by routing a film from a reel through two or more scanning systems, scanning the film in parallel using the scanning systems, and creating a scanning operation dataset from the outputs of the scanning systems.

Implementations may include one or more of the following features. For example, scanning the film in parallel may include scanning the film in parallel using multiple scanning heads, with each scanning head being configured to create a scanning operation dataset from a portion of the single scanning operation of an image in a reel of film. Scanning the film in parallel using the multiple scanning heads may include using the multiple scanning heads to capture multiple film frames simultaneously, or scanning multiple frames in the film using a single scanning operation on a single scanning head.

One or more post-production processing operations may be performed on the scanning operation data set before the scanning operation data set is saved. The post-production processing operations may include film and dirt cleanup processing, resolution conversion, color correction, registration, and/or special effects.

Performing the post-production processing operation may include initiating the post-production processing operation as the film is being scanned. Initiating the post-production processing operation as the film is being scanned may include initiating the post-production processing on a frame in a set of frames while the set of frames is being scanned, or initiating the post-production processing on a portion of frame while the frame is being scanned.

Performing the post-production processing operation may include completing the post-production processing operation while a portion of the film is being scanned. Completing the post-production processing operation may include completing the post-production processing on a frame in a set of frames while the set of frames is being scanned, or completing the post-production processing on a portion of a frame while the frame is being scanned.

The scanning operation dataset may be transmitted to a post-production processing switch that coordinates post-production processing on the scanning operation dataset. Routing the film through the scanning systems may include routing the film over a compliance roller configured to incrementally advance the film. Routing the film through the scanning systems also may include routing the film through a spatial separator configured to maintain a reserve of unscanned images for each of the scanning sensors. The film may be incrementally advanced by using a compliance arm in a compliance roller. Interfacing with a scanning controller may provide one or more instructions for controlling the scanning system in scanning the film.

In another general sense, a film scanner may include a scanning controller and a multiple image scanning platform structured and arranged to create a scanning operation dataset based on a single concurrent scanning operation of multiple images in a reel of film. The scanning controller may be structured and arranged to control scanning operations of at least two concurrent scanning operations, where each scanning operation involves at least one image and at least one multiple image scanning platform.

Implementations may include one or more of the following features. The scanning controller may be structured and arranged to interface with a scanning manager managing more than one film scanner to transmit the scanning operation dataset to a film-processing device. The scanning controller may interface with a post-production processing switch. The multiple image scanning platform may include multiple image sensors on a common transport configured to capture multiple film frames simultaneously. The multiple image scanning platform may include a group one scanner without a telecini interface.

The scanning controller may be configured to transmit the scanning operation data set in an IP format. The scanning controller may be structured and arranged to transmit the scanning operation data set to a processor for post production processing before the scanning operation data set is stored. The post-production processing may include film and dirt cleanup, color correction, resolution conversion, special effects, and/or registration.

DESCRIPTION OF DRAWINGS

Like reference symbols in the various drawings may indicate like elements.

DETAILED DESCRIPTION

In general, film may be scanned by routing the film from a reel through two or more scanning systems arranged in series and by scanning the film in parallel using a series arrangement of scanning systems to create a scanning operation dataset. The film may be routed by a mechanism configured to advance film incrementally from a reserve of unscanned frames into one or more of the scanning systems.

The film then is scanned to produce the scanning operation dataset, and one or operations are performed on scanned images within the dataset before it is saved. For example, the scanned images may undergo film and dirt cleanup, color correction, resolution conversion, registration, special effects, and/or other operations, before the dataset is saved.

Figure 1:
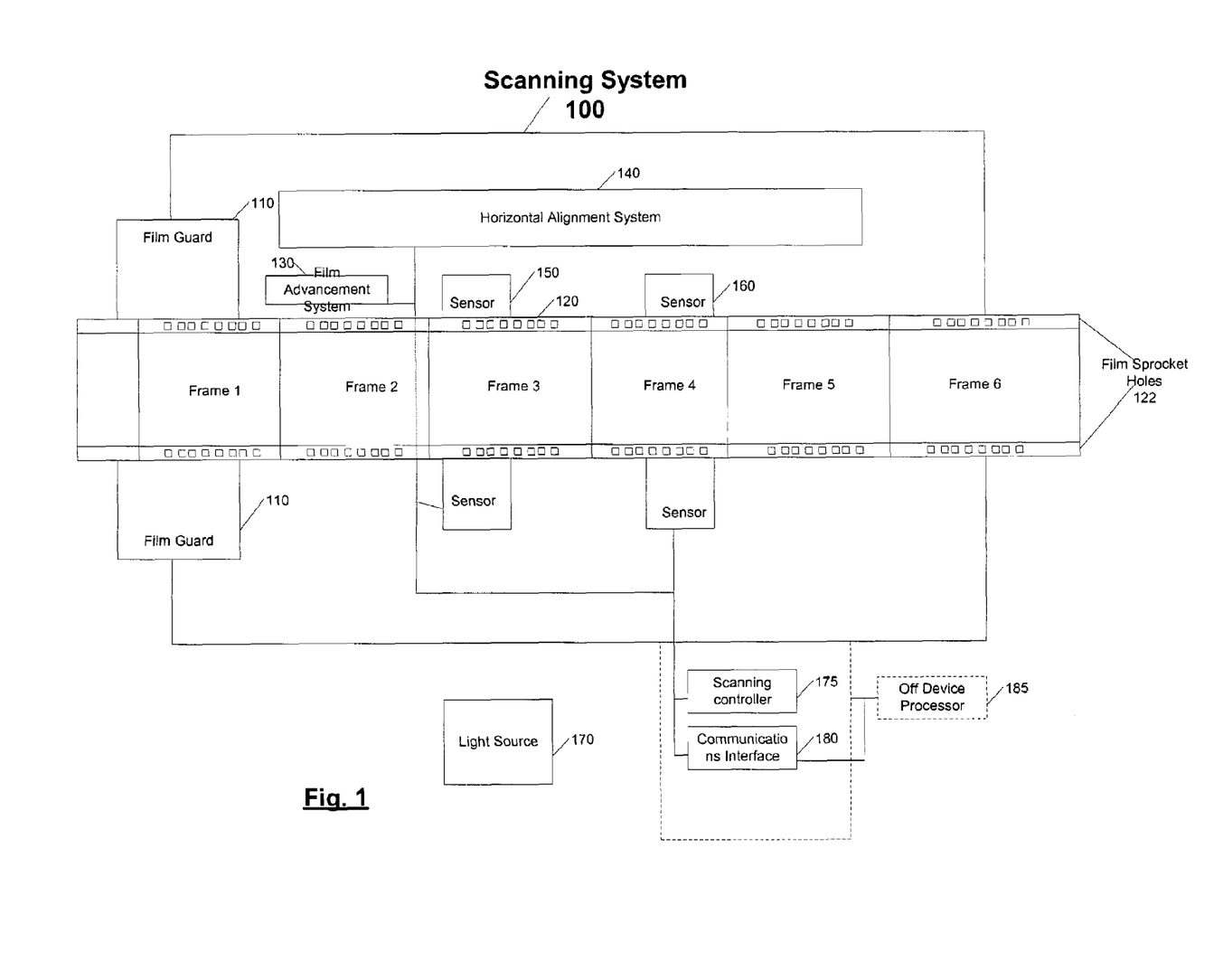
FIG. 1 illustrates a scanning system configured to scan film as part of a compound scanner.

FIG. 1 illustrates a scanning system 100 configured to scan film in a compound scanner. Specifically, scanning system 100 includes a film guard 110 configured to receive film 120. The film 120 is moved by a film advancement system 130, where the film 120 is scanned in conjunction with a horizontal alignment system 140, sensors 150 and 160, and a light source 170.

Generally, the film guard 110 is mechanically configured to receive a piece of film and route the film into the scanning system 100. The film guard 110 may include a roller (not shown) configured to receive the film from a compliance roller (not shown) so that the film is not damaged by the scanning system 100.

The film guard 110 may include one or more components configured to protect the film and preserve a high quality image for scanning. For example, the film guard 110 may include a ventilation or vacuum system (not shown) configured to remove dust from the film. Film guard 110 also or alternatively may include a polarized or charged surface (not shown) designed to remove dust by attracting dust to a film guard charged to the opposite polarization.

The film 120 includes images organized into frames. The images on the film 120 are used to generate a motion picture as a sequence of images. The film 120 includes sprocket holes 122 configured to engage a sprocket (not shown) used to advance the film 120. The sprocket holes 122 includes a band of holes along the edge of the film 120 to enable a device (e.g., a toothed wheel (not shown)) in film advancement system 130 to be mechanically inserted in the holes. In one example, the film sprocket holes 122 are used to advance the film 120 through the scanning system 100.

The film advancement system 130 includes one or more drives, motors, gears, wheels or other mechanisms (not shown) configured to advance the film 120 through the scanning system 100. A variety of techniques may be used to advance the film 120 and to scan images on the film, each being associated with a different kind of film advancement system 130. In one example, the film advancement system 130 guides the film 120 by using sprockets (not shown) to interface in the film sprocket holes 122. The sprockets pull or push the film through the scanning system 100. In another example, the film 120 advances the sprockets because the film 120 is pulled (or pushed) through the scanning system 100 by another mechanism, with the sprockets merely tracking the movement of the film 120 through the scanning system 100. In yet another example, the film advancement system 130 includes a set of wheels designed to advance the film without using the film sprocket holes 122.

The film advancement system 130 also is coupled to sensors 150 and 160. For example, multiple frames may be advanced into a scanning window within the scanning system 100. Once the multiple frames are loaded to the scanning window in the scanning system 100, the film advancement system 130 controls the sensors 150 and 160 to make one or more scanning passes at the film 120.

Several kinds of sensors 150 and 160 may be used. In one example, the sensors 150 and 160 are configured as a one-dimensional array of sensors. The one-dimensional array of sensors is moved (e.g., by film advancement system 130) over an image as a light source 170 illuminates the image. The sensors take periodic readings to measure an optical value for a pixel at the present location of the one-dimensional array. The vertical position then is recorded with the pixel value, creating a row of horizontal resolution. The composite two-dimensional image may be generated by compiling the linear array of sensor values to create vertical detail with the different snapshots that were taken as the sensor was moved.

The sensors 150 and 160 also may be configured as a two-dimensional array. For example, a two-dimensional array of sensors may scan one or more frames simultaneously. Alternatively, the two-dimensional array of sensors may be moved to scan different frames. In any event, the two-dimensional array of sensors differs from the one-dimensional array of sensors in that more rows of vertical resolution are provided per scanning operation.

The sensors 150 and 160 also may be configured as a three-dimensional array of sensors. For example, a charge-coupled sensor may use a two-dimensional array of sensors to capture horizontal and vertical information and use three bands of colors in three layers in the array to capture color information.

The sensors 150 and 160 also may move across the film. For example, the film advancement system 130 may advance two frames to the beginning of each sensor. The sensors 150 and 160 then may be slowly advanced over each sensor. For example, the sensors 150 and 160 may be coupled to a system (not shown) configured to move the sensors over a scanning window to move a scanning pass across the film.

There may be one or more post-production processing operations done between or even during scanning operations. For example, as scanning operations may take longer to perform than some post-production processing operations, the film images may be computationally processed during or following the scanning operation. Still, even where the post-production processing operations require more time and/or resources than the scanning operation, the post-production processing still may be at least initiated during scanning operations.

In one example, as a frame is processed (i.e., before scanning processes have been completed), the frame may be sent to an off-device processor to perform special effects, scratch and dirt cleanup, compression, film registration, color connection and/or other processing. Depending on the nature and requirement of the post-production processing operation, the off-device operations may be performed in parallel and/or on several machines. For example, certain pixel processing operations may be performed before the entire frame has been received.

Similarly, certain operations may not be performed or even initiated until the frame has been scanned completely. For example, for certain types of compression in which it is advantageous to compress an entire frame, compression may not be initiated until the entire frame has been scanned.

Other operations may require multiple frames to be scanned. For example, certain color correction calculations may use information from preceding frames to calculate a color correction value for a subsequent frame.

Operations on the scanning dataset may be performed in transit. For example, rather than write an entire image to storage, and then perform one or more operations on the image in storage, a scanned image may be transmitted to a post-production processing device for image compression prior to storage of the compressed image.

The scanning system 100 includes a scanning controller 175 configured to manage one or more aspects of the scanning operation. For instance, the scanning controller 175 may be configured to direct scanning operations performed by the scanning sensors 150 and 160. The scanning controller 175 also may transmit the scanning operation dataset (e.g., the scanned images) through a communication interface 180 to a post-production processor (shown as off-device processor 185) to undergo one or more post-production processing operations. For example, the scanning controller 175 may send scanned images to one or more selected post-production processing devices, such as, for example, a Linux computer configured to remove artifacts of dirt from scanned images.

The communications interface 180 may include an IEEE 1394 ("Institute of Electrical and Electronic Engineers 1394") port configured to transmit the scanned images to another device. The communications interface 180 also may include an Ethernet port (e.g., Gigabit Ethernet, Fast Ethernet, or 10 Base T) configured to exchange data though a data communications network. In other examples, the communications interface 180 may include a HIPPI ("High Performance Parallel Interface") or proprietary interface configured to transmit the scanned images.

In one example, the scanning controller 175 and the communications interface 180 manage the transmission of the scanning operation datasets so that a scanning operation dataset is transmitted in data units to a post-production processing switch for processing. In this example, the scanned images may be sent in IP ("Internet Protocol") packets with the processing and/or scanning information incorporated into the attribute portion of the IP packet. Moreover, for example, portions of the packet header may indicate resolution, priority, frame number, post-production processing operation to be performed, and/or storage requirements.

The scanning controller may be configured to communicate with one or more other off-device processors 185 (e.g., one or more post-production processing systems). For example, the scanning controller 175 may interface with a resource manager configured to manage post-production processing resources, a post-production processor, a storage device, a post-production processing switch, and/or other devices.

The off-device processor 185 may be configured to perform one or more post-production processing operations. For example, a post-production processing system may be configured to perform film and dirt cleanup, resolution conversion, color correction, registration (e.g., making sure the images are correctly aligned), special effects, and/or other operations.

The scanning controller may be distributed on one or more systems. For example, portions of scanning controller that direct the sensors 150 and 160 may reside as code segments running on a microprocessor in the scanning system 100. Additionally or as an alternative, all or part of the scanning controller may reside on a server configured to manage multiple scanning systems. For example, the server may include a code segment configured to coordinate film and dirt cleanup.

Scanning system 100 may include scanners of various types, but for purposes of illustration, two types are described: group one scanners and group two scanners. A group one scanning system refers to a scanning system without a telecini interface. Generally, a telecini interface is a film interface configured to transport film in real time. This may include an intermittent motion scanning system that stops advancing the film to scan in the image. In contrast, a group two scanning system refers to a scanning system with a telecini interface. This may include a film scanner that continually advances the film as the film is being scanned. Because of the differences in operation resulting from the speed in which the group one and group two scanning systems perform, the group one systems may be configured to operate in a different manner than the group two systems.

Typically, because of the intermittent operation of group one scanning systems, and hence their relatively slow operation when contrasted with group two scanning systems, the group one scanners may enable relatively high resolutions to be obtained by permitting the sensors 150 and 160 to have a relatively long time to determine image values.

In addition, the relatively slow scanning rate of group one scanning systems may enable the scanned images or scanning operation data set to undergo post production processing during the scanning process (i.e., before the process is otherwise fully completed). For example, one or more types of processing may be performed on the scanning operation data set before the image is stored. The processing may include resolution conversion, compression/recompression, film registration, color correction, and/or special effects. Depending on the configuration of the scanning system and the post-production processing system, the scanned image may be temporarily stored on the processor that is performing the post production processing. However, performing the post-production processing before the image is stored may reduce the storage requirements. For example, instead of having a separate digital instance/file for the film that reflects the scanned images after each operation, the number of instances may be reduced by performing the process, or at least initiating the process before storing the image.

The group two scanning systems operate at a faster rate that leads to a reduced time in which to obtain an image. As scanned images arrive more quickly, the reduction in available time may preclude post-production processing operations from being performed or initiated. Typically, the group two scanning systems include a high intensity light source and a film advancement system that continuously advances the film across the light source and the sensors.

Although the group one and group two scanning systems have been described, other types of scanning systems may be used. For example, a different type of scanning system may include a continuous motion scanning system that uses multiple scanning heads in parallel on a single piece of film. In this example, a continuous motion scanning system may perform post-production processing as the images are received.

Figure 1A:
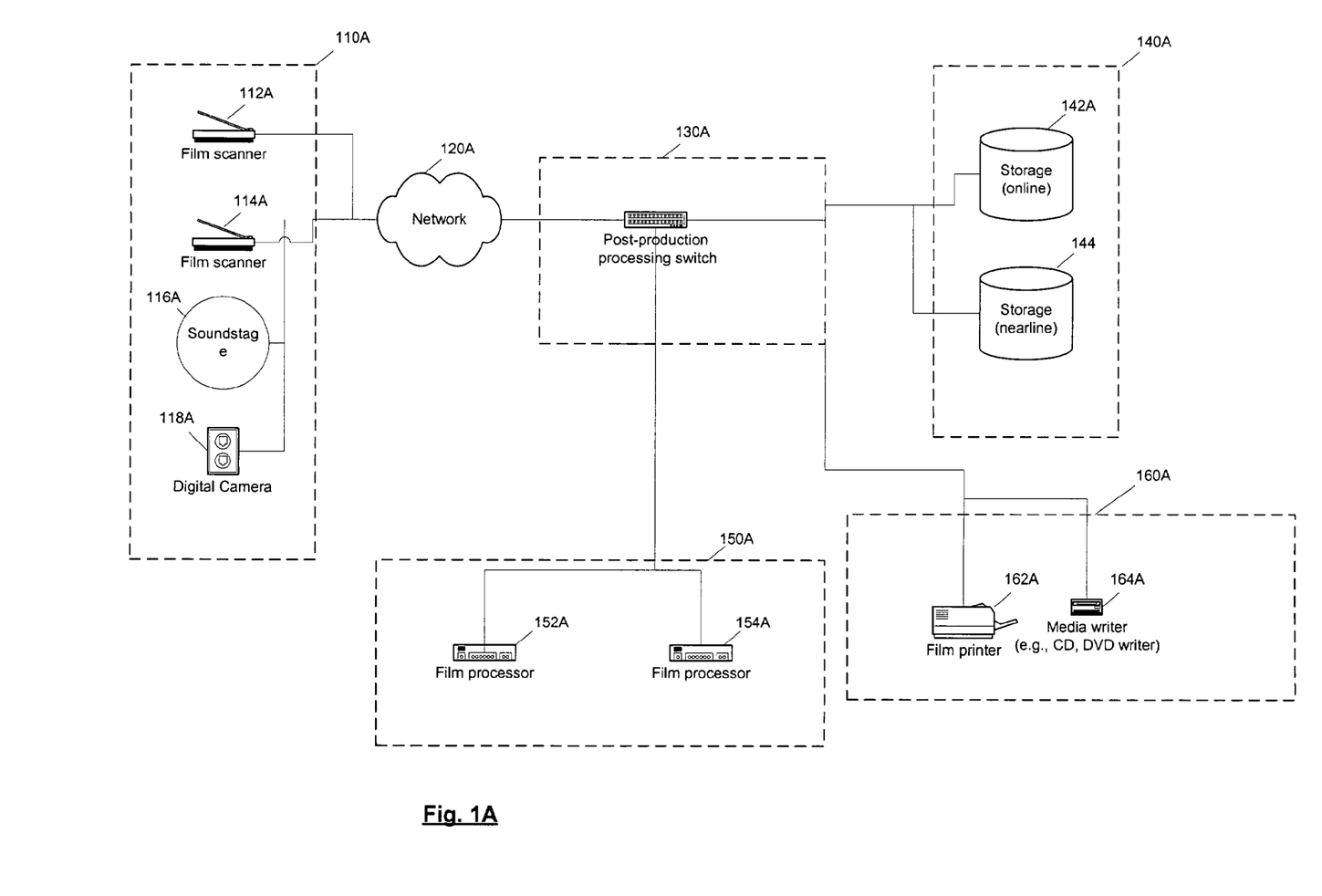
FIG. 1A illustrates integration of a compound scanner into a post-production processing system.

FIG. 1A shows an exemplary film processing system 100A. Specifically, FIG. 1A illustrates how a scanning system may be integrated into a post-production processing system. The scanners 112A and 114A shown in FIG. 1A may relate to the scanning systems described previously. For example, the scanner 112A may include a scanning system with an integrated scanning head such as is described with respect to FIG. 3. Similarly, the processor 150A may relate to the off-device system 185 described previously. The scanning controller 175 and the communications interface 180 described with respect to FIG. 1 may be used to communicate through network 120A with other devices in the film processing system 100A.

Generally, the film processing system 100 A is capable of receiving a film series in a first format and converting the film series to a second format. These formats may include different resolutions (e.g., 4 k resolution to 2 k resolution), different media formats (e.g., storage to film), and/or different degrees of processing (e.g., from pre-special effects to having special effects).

Film processing system 100A includes an input source 110A, a network 120A, a post-production processing switch 130A, one or more storage devices 140A, one or more processors 150A, and an output system 160A. Input source 110A generally includes one or more devices configured to receive analog or unprocessed data and convert that data into a film series suitable for digital processing. The input source 110A may include one or more of a film scanner 112A, or an array of film scanners (for example, film scanners 112A and 114A). Generally, the film scanners 112A and/or 114A convert the frames of a film reel into one or more digital images. The film scanners 112A/114A may serially scan one frame of the film at a time, or they may concurrently scan several frames in parallel.

When several frames are scanned in parallel, or when several film scanners are used, some additional processing may be required to perform film registration. For example, the film scanner 112A may send the film series to the post-production processing switch 130A, and the post-production processing switch 130A may send the film series from the film scanner 112A to the processor 150A to perform the preliminary processing. In another example, the film scanner 112A may include logic to perform the initial processing.

The input source 110A may include a soundstage 116A and/or a digital camera 118A. Depending on the configuration and properties of the equipment, a film series from soundstage 116A and/or the digital camera 118A may require different processing than a film series from the film scanner 112A or the film scanner 114A. For example, registration and processing may not be required for a film series from a digital camera 118A. However, where the resolution of a digital camera 118A is lower than needed (e.g., less resolution than the resolution of film scanner 112A), the film series from the digital camera 118A may be processed by interpolation programs to generate a film series of a sufficiently high resolution. In another example, the film series from a digital camera 118A may require additional color correction and/or distortion processing.

Network 120A includes hardware and/or software capable of enabling direct or indirect communications between the input source 110A and the post-production processing switch 130A. As such, the network 120A may include a direct link between the input source 110A and the post-production processing switch 130A, or the network 120A may include one or more networks or subnetworks between them (not shown). Each network or subnetwork may include, for example, a wired or wireless data pathway capable of carrying and receiving data. Examples of the delivery network include the Internet, the World Wide Web, a WAN ("Wide Area Network"), a LAN ("Local Area Network"), analog or digital wired and wireless telephone networks, radio, television, cable, satellite, and/or any other delivery mechanism for carrying data. Although the network 120A is shown between the input source 110 and the post-production processing switch 130A, the network 120A illustrates that other devices in the film processing system 100A are not necessarily directly connected to the post-production processing switch 130A. For example, some or all of the devices also may be connected to the post-production processing switch 130A through one or more intermediary networks, such as network 120A. Likewise, some or all of the devices shown in FIG. 1A may be directly connected to the post-production processing switch 130A.

Typically, the post-production processing switch 130A is configured to receive a film series, determine a state indicating an operation to be performed on the film series, identify a resource to process the film series, and interface with the resource to enable the operation to be performed on the film series. In some implementations, the post-production processing switch 130A is structured and arranged to perform filtering and forwarding between different domains at the same level of the protocol stack in the OSI ("Open System Interconnection") reference model. For example, post-production processing switch 130A may forward Ethernet frames between different Ethernet segments. In another example, post-production processing switch 130A may forward IP ("Internet Protocol") packets between different IP subnets.

Generally, the post-production processing switch 130A includes a device that performs network operations and functions in hardware (e.g., in a chip or part of chip). In some implementations, the post-production processing switch 130A may include an ASIC ("Application Specific Integrated Circuit") implementing network operations logic directly on a chip (e.g., logical gates fabricated on a silicon wafer and then manufactured into a chip). For example, an ASIC chip may perform filtering by receiving a packet, examining the IP address of the received packet, and filtering based on the IP address by implementing a logical gate structure in silicon.

Implementations of the post-production processing switch 130A may employ a Field Programmable Gate Array (FPGA) device. A FPGA device generally is defined as including a chip or chips fabricated to allow a third party designer to implement a variety of logical designs on the chip. For example, a third party designer may load a FPGA device with a design to replace the received IP addresses with different IP addresses, or may load the FPGA device with a design to segment and reassemble IP packets as they are modified while being transmitted through different networks.

Implementations of the post-production processing switch 130A also may employ a network processor. A network processor generally is defined to include a chip or chips that allow software to specify which network operations will be performed. A network processor may perform a variety of operations. One example of a network processor may include several interconnected RISC ("Reduced Instruction Set Computer") processors fabricated in a network processor chip. The network processor chip may implement software on some of the RISC processors to change an IP address of an IP packet. Other RISC processors in the network processor may implement software that monitors which terminals are receiving an IP stream.

Although various examples of network operations were defined with respect to the different devices, each of the devices tends to be programmable and capable of performing the operations of the other devices. For example, the FPGA device is described as the device used to replace IP addresses and segment and reassemble packets. However, a network processor and ASIC are generally capable of performing the same or similar operations.

The post-production processing switch 130A may be configured to perform protocol conversion. For example, the post-production processing switch 130A may receive from a film scanner a film series having a proprietary format. The post-production processing switch 130 may receive the film series, classify the film series, and convert the proprietary protocol into a standards-based protocol (e.g., TCP/IP ("Transport Control Protocol/Internet Protocol")).

The post-production processing switch 130A may be configured to process protocol parameters that are descriptive of the film series. For example, in a received film series, a specified offset may be used to communicate the state of the film series and/or the film processing parameters. The post-production processing switch 130A may use the parameters to determine the state of the film series, identify an operation to be performed on the film series and/or identify a resource to process the film series. For example, a first parameter may be used to indicate the resolution of the image, the color map used, and/or the format of the image (e.g., JPEG ("Joint Photographic Experts Group") 2000). A second parameter may indicate whether film registration, special effects, resolution conversion, and/or film cleanup are required. A third parameter may be used to indicate the device on which to store, process or output the film series.

The protocol parameters may use common networking standards. For example, the film processing parameters may be mapped onto the TCP/IP protocol. As such, the IP address may indicate the IP address of a resource in the film processing system 100A, the layer-three port number may indicate the processing or operation to be performed, and the layer-four parameters may be used to indicate additional processing requirements, such as, for example, the desired resolution and/or required processing time.

The post-production processing switch 130A may map these parameters to a protocol to enable a resource to process the film series based on the parameters in the data unit. For example, a processor 150A may be configured to automatically perform the operations (e.g., film cleanup) indicated in the data unit (IP packet) of the film series.

The storage device 140A generally includes one or more devices to store the film series in its various stages. For example, the film series may be stored as the film series is being scanned. At this stage, the film series may include, for example, a multi-terabyte data set. To reduce storage requirements, portions of the film series may be stored in different states. For example, the film series may be stored to a server from an array of film scanners. The scanning process may require some length of time to process the several reels of film. As the film is being scanned, the stored film series may be sent to an array of processors to perform the film registration. Once registered, the film series may be stored over the previous unregistered images, eliminating the requirement to store the same images in an unregistered format. Alternatively, the unregistered images may be moved to nearline or offline storage devices for backup.

One example of a storage device 140A is a general-purpose computer (e.g., a server) capable of responding to and executing instructions in a defined manner. Other examples include a personal computer, a special-purpose computer, a workstation, a device, a component, other equipment, or some combination thereof capable of responding to and executing instructions. The storage device 140A may include and/or form part of an information delivery network, such as, for example, a data center, the Internet, the World Wide Web, an online service provider, and/or another analog or digital wired and/or wireless network that provides information.

The storage device 140A may receive instructions from a software application, a program, a piece of code, a device, a computer, a computer system, or a combination thereof that independently or collectively directs operations of the node. The instructions may be embodied permanently or temporarily in any type of machine, component, equipment, storage medium, or propagated signal that is capable of being delivered to the storage device 140A.

In one implementation, the storage device 140A includes one or more information-providing software applications for accessing and transmitting requested files to the other devices in the film processing system 100A. The information-providing applications may run on a general-purpose operating system and a hardware platform that includes a general-purpose processor and/or specialized hardware. Another implementation may include a reduced operating system with both general purpose and specialized hardware. One example of a storage device 140A as a specialized device is a network-attached storage array.

A storage device 140A may run several applications, or a storage device 140A may be dedicated to one or more applications. Examples of the storage device 140A dedicated to one application include a network-attached storage device configured to respond to instructions from a peripheral device (e.g., film scanner 112A, post-production processing switch 130A, processor 150A).

The storage device 140A may include an online storage device 142A, a nearline storage device 144A, and/or an offline storage device (not shown). Generally, online storage device 142A stores the film series such that the film series can be accessed in real time. Online storage device 142A may include a server that stores the film series to memory and/or disk drives. Nearline storage device 144A stores the film series such that the film may be accessed in short order. For example, the nearline storage device 144A may include a tape drive or a robotic array of optical media that loads and queues the tape drive data before accessing the storage media. In general, offline storage stores the film series in a mode that may require additional operator intervention. For example, the offline storage device may include tape storage that is placed in a library. For the offline data series to be accessed, a technician may be required to access and load the tape drive. Aspects of the online storage device 142A, the nearline storage device 144A, and the offline storage device may resemble one another as the access time improves. For example, as tape drive access times improve, the properties and performance of the tape drive may approach the performance of the server. Rather than representing fixed classes of equipment, the classification of storage devices describes possibilities for storing a film series.

The processor 150A may include an array of one or more processors (e.g., processors 152A and 154A) configured to perform one or more processing operations on digital images within the film series. As such, the processor 150A may include one or more devices capable of accessing a film series and performing one or more operations on the film series. The processor 150A may include a controller (not shown) that processes instructions received from or generated by a software application, a program, a piece of code, a device, a computer, a computer system, or a combination thereof, which independently or collectively direct operations of the processor 150A. The instructions may be embodied permanently or temporarily in any type of machine, component, equipment, storage medium, or propagated signal that is capable of being delivered to the processor 150A or that may reside with the controller at processor 150A. Processor 150A may include a general-purpose computer (e.g., a personal computer) capable of responding to and executing instructions in a defined manner, a workstation, a component, other equipment, or some combination of these items that is capable of responding to and executing instructions.

In one implementation, the processor 150A includes one or more information retrieval software applications (e.g., a file system client) capable of receiving a film series in a variety of states. The information retrieval applications may run on a general-purpose operating system and a hardware platform that includes a general-purpose processor and specialized hardware for film processing and/or other capabilities. In another example, the processor 150A may run a specialized operating system and/or operate on specialized hardware.

The processor 150A may be configured to enable the post-production processing switch 130A to select one of several programs, operations, or processes to be performed on the processor 150A. Examples of the operations that may be performed by the processor 150A may include, but are not limited to, registration, color mapping, film cleanup, special effects, and/or resolution conversion.

The processor 150A may include a reconfigurable device capable of responding to film processing requirements indicated by the post-production processing switch 130A. For example, the post-production processing switch 130A may manage an array of 100 processors as a pool of processing commodities. Depending on the requirements of the film series and the priority of the operations, the processors may be allocated by the switch 130A to meet the priorities and/or requirements.

For example, a high priority task may include creating the product for the director's daily review. In this example, many or all of the 100 processors in the array might be allocated to perform the necessary processing. In another example, an archive of older film movies might be processed and/or remastered for re-release. In this example, each of two movies might be allocated 50 processors, absent additional tasking. If a higher priority tasking was received, then the two movies each might relinquish 30 processors to the higher priority task, with each movie being processed by 20 processors.

The output system 160A may include one or more devices configured to write the content to an output medium. In one example, the output medium may include a master film created by a film printer 162A. This master film then may be used to create duplicates for distribution to cinemas. In another example, the output system 160 may include a media writer 164A (e.g., a DVD writer or a disk array for digital film distribution) designed to create digital media products for distribution.

Although the devices shown by FIG. 1A illustrate that various devices may be included in a film processing system 100A, some film processing systems 100A may be designed with greater or fewer devices, or merely a subset of the devices shown in film processing system 100A of FIG. 1A. For example, a different film processing system may include only an array of one or more film scanners.

Figure 2:
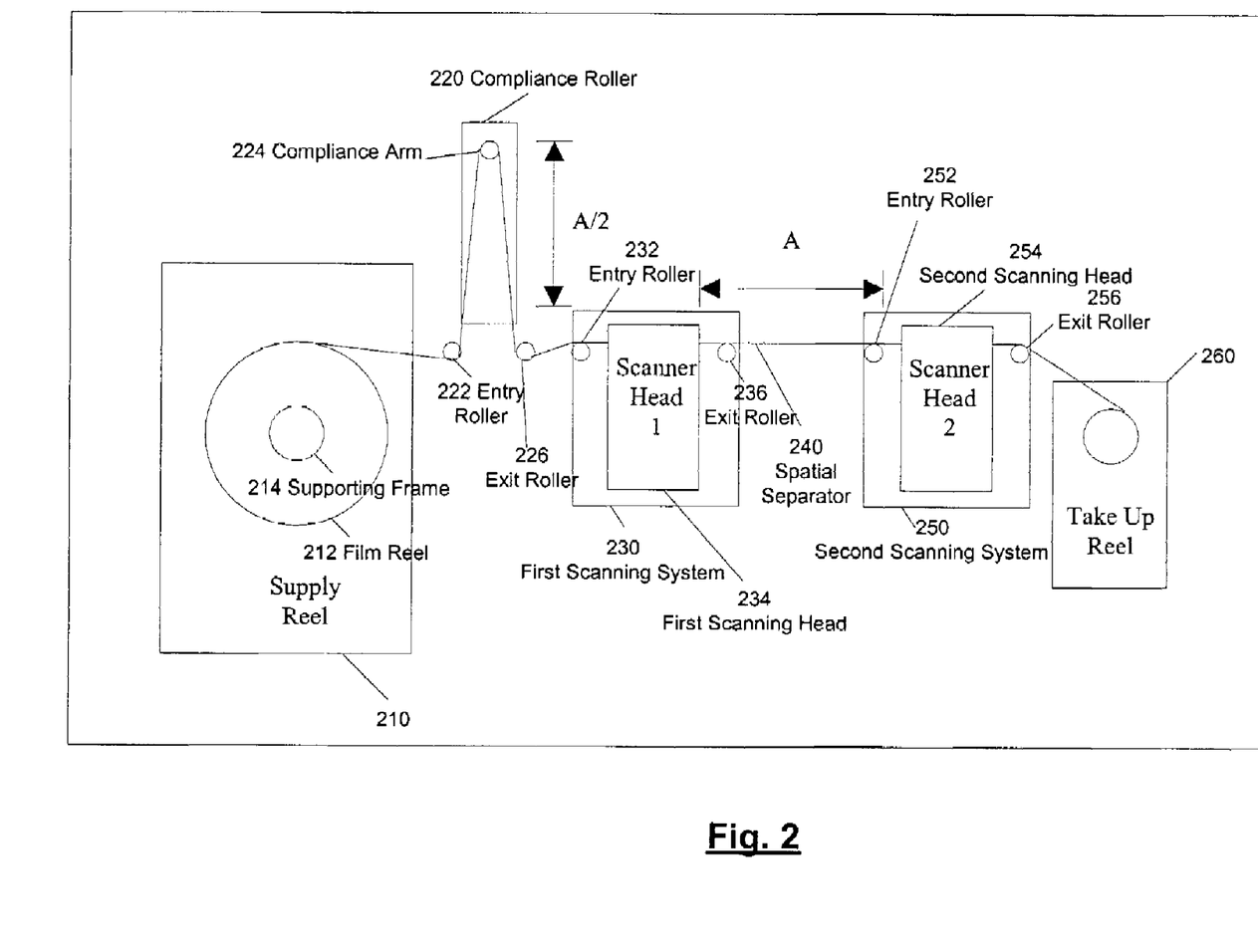
FIG. 2 illustrates an exemplary compound scanner configured to use multiple scanning systems.

FIG. 2 shows an exemplary compound scanner 200. Generally, compound scanner 200 describes a scanner that processes a reel of film by scanning more than one portion of the film simultaneously. The compound scanner 200 includes a supply reel system 210, a compliance roller 220, a first scanning system 230, a spatial separator 240, a second scanning system 250, and a take up reel system 260.

The supply reel system 210 includes a film reel 212 and supporting frame 214 configured to feed a film into one or more scanning systems. In this case, the supply reel system 210 feeds the film into the compliance roller 220 for subsequent scanning.

The film reel 212 includes a structure around which film is wound. Typically, the film reel 212 may include film footages of length 500, 1000, or 2000 feet. However, the film may be of other lengths, depending on the production process. In one example, the film may be cut to a shorter length to maximize the number of parallel scanning systems that may be used. For example, every take may be cut onto its own reel. While this may prove impractical for many implementations, this configuration may prove advantageous for post-production operations requiring rapid processing.

The frame 214 may include a motor, a gear, a feed, a mechanical reel, and/or a combination of the above or other mechanisms configured to enable the film to be advanced. The frame 214 may include a lock (not shown) configured to stop the supply reel system 210 from advancing film. The lock may be selectively engaged and disengaged to support the coordinated scanning operations. These scanning operations may be coordinated with, for example, the compliance roller 220, the first scanning system 230, the second scanning system 250, and/or the take up reel 260.

In one example, the frame 214 may enable the film 212 to be advanced by a take up reel system 260 configured to pull the film from the supply reel system 210 through the scanner 200. In another example, the supply reel system 210 pushes the film 212 while the take up reel 260 pulls the film. In yet another example, the compliance roller 220 advances the film while the supply reel system 210 and the take up reel 260 maintain tension in the film 212.

The compliance roller 220 is a system configured to advance the film incrementally for scanning by scanning systems 230 and 250. The compliance roller 220 may be operated in a variety of configurations. In the example shown, the compliance roller 220 receives the film at an entry roller 222 and routes the film over a compliance arm 224 and out an exit roller 226. As the compliance arm 224 is raised, film is loaded from the supply reel system 210. For example, when the take up reel system 260 is locked, raising the compliance arm 224 advances the next portion of frames feeding into the scanning system by pulling them off of the supply reel system 210 and into the compliance roller 220.

As mentioned, in the implementation shown by FIG. 2, the compliance roller 220 includes an entry roller 222, a compliance arm 224 and an exit roller 226. The entry roller 222 maintains tension in the film so that the film follows a constant path as the film enters the compliance roller 220. The compliance arm 224 includes a roller that may be raised or lowered. By coordinating the raising and lowering of the compliance arm 224 with the advancement and locking of film on the supply reel system 210, and/or the take up reel system 260, the film may be selectively advanced. The film leaves the compliance roller 220 through exit roller 226. Exit roller 226 is configured to provide an exit point for the compliance roller 220 to maintain the film in the path.

The entry roller 222, the compliance arm 224, and the exit roller 226 may be configured so that the portion of film between the entry roller 222, the compliance arm 224, and the exit roller 226 maintains a film path of a predetermined and selected length. In other words, the compliance roller 220 advances the film a specified length per movement of the compliance arm 224. For example, the length between the entry roller 222 and the compliance arm 224 may be set to be half the length of the distance between two scanning systems (e.g., first scanning system 230 and second scanning system 250). Similarly, the distance between the compliance arm 220 and the compliance roller 226 may be set to half this distance. Accordingly, in a compound scanner of two serially-arranged scanning systems, the length of film in the compliance roller 220 between the entry roller 222 through the compliance arm 224 out through the exit roller 226 may be set to the distance between the two scanning systems arranged in series. Depending on the configuration of the scanning systems, the distance may be changed.

The first scanning system 230 includes an entry roller 232, a first scanning head 234, and an exit roller 236. Generally, the first scanning system 230 relates to the scanning system described previously with respect to FIG. 1. For example, the first scanning system 230 receives a portion of film through the entry roller 232 to permit the first scanning head 234 to scan in one or more frames. However, the first scanning system 230 shows how a scanning system may be configured relative to other components in a system. In the example shown in FIG. 2, the film scanning system 230 may be located between a compliance arm 220 and a second scanning system 250.

The spatial separator 240 includes a piece of the compound scanner 200 configured to maintain a distance in the length of film separating two scanning systems. In compound scanner 200, the exit roller 236 and an entry roller 252 of the second scanning system 250 maintain a predetermined distance (in this case distance A) between the first scanning system 230 and the second scanning system 250. The spatial separator 240 may be used to ensure that each scanning system has a reserve of scannable frames spanning distance A. For example, the compound scanner may advance to a certain portion of the film so that each scanning system has a reserve of unscanned frames that may be advanced to or otherwise scanned by the scanner. This reserve of unscanned frames may be maintained in the spatial separator 240. A similar reserve of unscanned frames also may be maintained in the compliance roller. For example, the compliance roller 220 may perform incremental advancement while maintaining a reserve of unscanned frames for the first scanning system 230.

The second scanning system 250 includes a scanning system similar to the first scanning system 230. For example, the second scanning system 250 may receive a portion of film through the entry roller 252 to be scanned in by a second scanning head 254. The second scanning head 254 may route the film through an exit roller 256.

Generally, the second scanning system 250 is configured to process a different portion of the film than is processed by the first scanning system 230. For example, the first and second scanning systems may scan different groups of frames in parallel, so that each scanning system scans approximately half the frames. Similarly, where more than two scanners are employed, the scanning of frames may be offset based on the configuration of the scanning systems and the distance in the spatial separator.

The take up reel 260 is configured to receive film that is being fed to it from the second scanning system 250. Aspects of the take up reel 260 may resemble aspects of the supply reel 210, modified to receive film instead of provide film. For example, the take up reel 260 may include a lock that may be selectively engaged in support of the coordinated scanning operations. The scanning operations may lock the take up reel while the compliance arm 220 is queuing up film for subsequent scanning.

Figure 3:
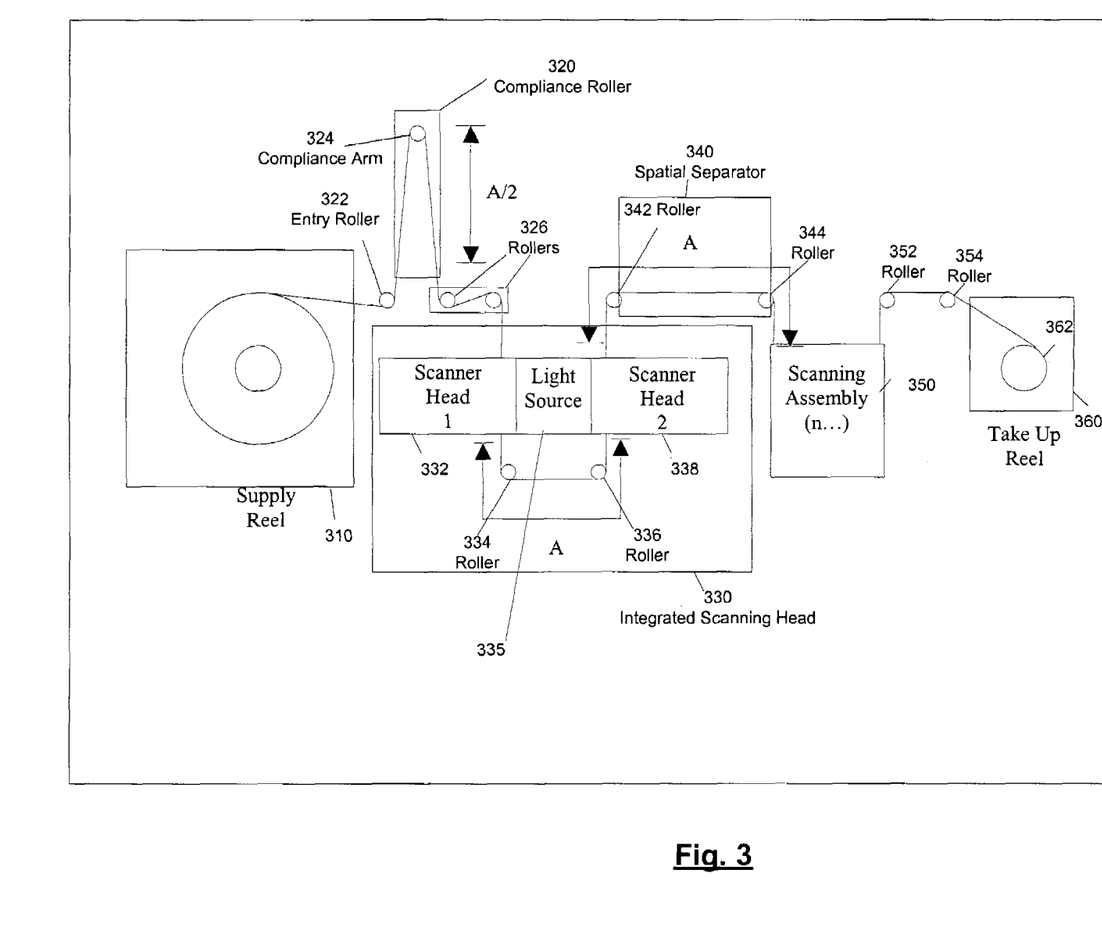
FIG. 3 illustrates an exemplary compound scanner configured to use integrated scanning heads.

FIG. 3 illustrates a compound scanner 300 configured to scan a reel of film through the use of integrated scanning heads. Integrating scanning heads describe a configuration for a scanning head in which a common light source and/or dust-free environment may be used. Generally, a supply reel 310 may feed film into a compliance roller 320 to perform incremental film advancement. Similarly, the compound scanner 300 may advance film into a first integrated scanning head 330 with the integrated scanning head 330 including scanning heads 332 and 338, rollers 334 and 336, and light source 335. The integrated scanning head 330 may feed the film into one or more other integrated scanning heads (e.g., scanning head 350) through a spatial separator 340. The other integrating scanning heads 350 may route the film through an exit roller 352 and an entry roller 354 into a take up reel 360.

Aspects of the compound scanner 300 have been described previously. For example, the supply reel system 310 and the take up reel system 360 may relate to supply reel system 210 and take up reel 260, the compliance roller 320 may relate to compliance roller 220, the spatial separator 340 may relate to the spatial separator 240, and aspects of the first integrated scanning head 330 may relate to the first and second scanning heads 230 and 250. More specifically, the first and second scanning heads 332 and 338 may be similar to the first and second scanning heads 234 and 254. Both the first and second scanning heads 332 and 338 and the first and second scanning heads 234 and 254 may be separated by a spatial separator of similar length. However, in the integrated scanning head 330, rollers 334 and 336 maintain the spatial separation, whereas in compound scanner 200, exit roller 236 and entry roller 252 maintain the spatial separation. Furthermore, the integrated scanning head 330 is configured to use a common light source 335 for both scanning heads. As is shown in FIG. 3, the first scanning head 332 is configured to capture light provided from one side of the light source 335, while the second scanning head 338 is configured to use the opposite side of the light source 335.

Figure 4:
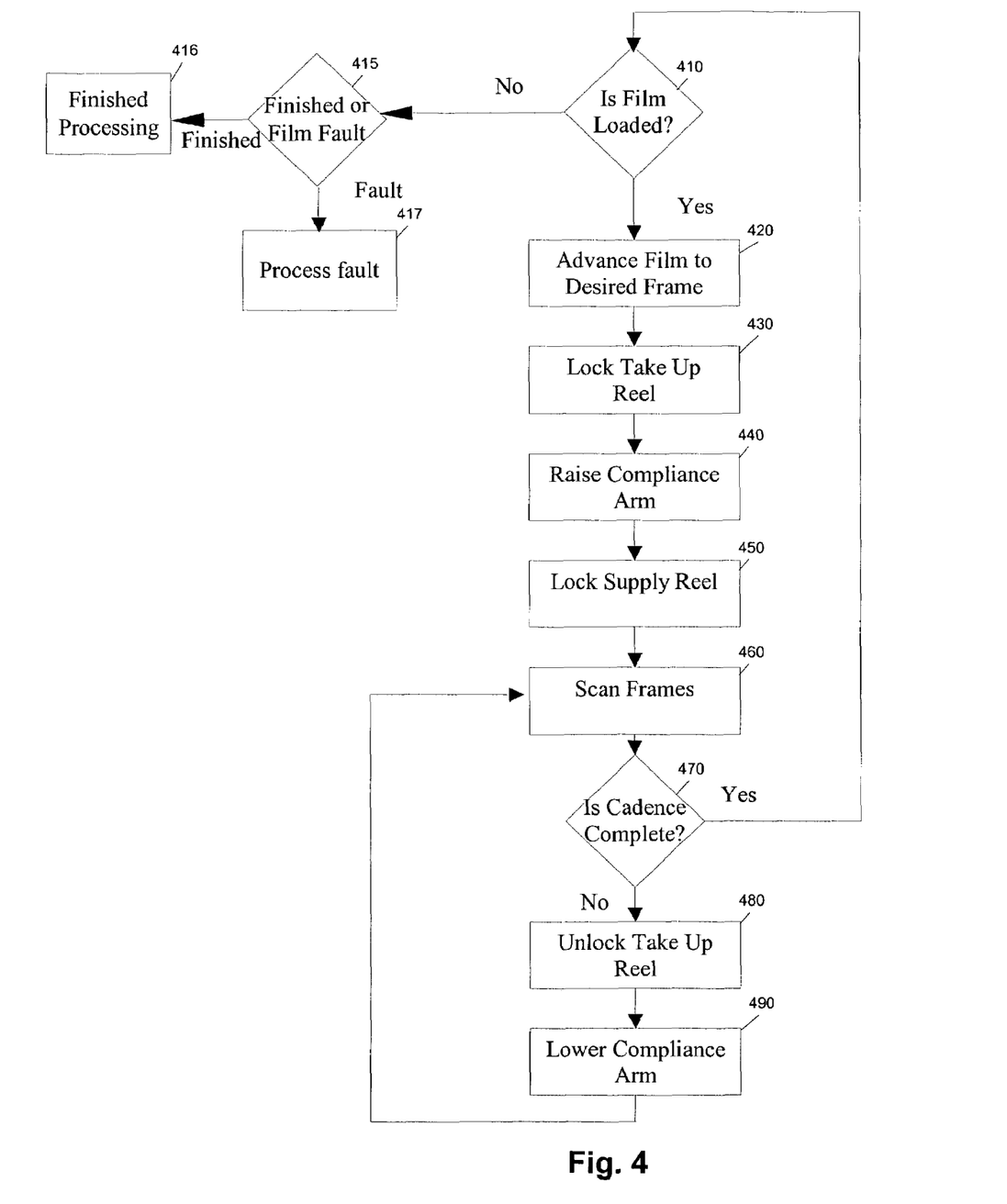
FIG. 4 is an exemplary flow chart showing a process used by a compound scanner to advance the portion of a film to be scanned.

Referring to FIG. 4, flow chart 400 illustrates how a compound scanner may advance film to be scanned. The compound scanner may be an intermittent motion scanner, such as a group one scanner. Specifically, the flow chart 400 shows how a supply reel, a compliance roller, a scanner, and a take up reel may be controlled to coordinate film scanning. Generally, the supply reel, the compliance roller, the scanner, and the take up reel have been described previously, such as, for example, with respect to supply reel systems 210 and 310, compliance rollers 220 and 320, scanning systems 230, 250, and 330, and take up systems 250 and 350.

Initially, the compound scanning system determines if the film is loaded (step 410). If the film is not loaded, the compound scanning system determines whether the film is finished or if there is a fault (e.g., component failure, film break) (step 415) and acts appropriately. If the film is finished processing (step 416), the film may be secured so that the film is not damaged. For example, an alarm may be generated to notify a technician to remove the film from the scanner. In another example, the film may be released from the supply reel system in an automated manner and wound around the take up reel. If the film is experiencing a fault (e.g., film break, surface defect) (step 417), the film may be secured to mitigate further damage. For example, if the scanning system detects a surface defect in the film (e.g., by scanner guard 110), the film may lock the supply and take up reels so that the film is not advanced further. The compliance roller also may be lowered to reduce tension in the film.

If the film is loaded, then the compound scanning system advances the film to the desired frame (step 420). Advancing the film to the desired frame may include advancing the film so that there is a reserve of unscanned frames located in the spatial separator. With a reserve of unscanned frames in the spatial separator, the compound scanner may use the compliance arm to incrementally advance frames from within the reserve. For example, if three scanners are used in the compound scanner with each scanner having a spatial separator to provide a reserve, the compound scanner may advance the film so that the furthest scanner from the supply reel has a reserve of unscanned frames. Typically, this will include advancing frames intended to be scanned by the furthest scanner through other scanners to reach the furthest scanner.

When the film is advanced to the appropriate portion, the take up reel is locked (step 430). Typically, the take up reel is locked to stop the film from being advanced. For example, the take up reel may be configured to maintain a pulling force on the film. This pulling force would ordinarily advance the film. However, locking the take up reel may prevent the film from being advanced. The compliance arm is raised (step 440), advancing film from the supply reel to the compliance arm for incremental advancement, the supply reel is locked (step 450) and frames are scanned (step 460). The compound scanner then determines if the set of frames (which also may be referred to as a cadence) is complete (step 470). Typically, determining if the set of frames is complete includes determining that there are no further frames to be scanned by incrementally advancing the film with the compliance arm. For example, if the distance in the spatial separator, that is, the reserve of frames, is a distance A and twice the distance twice (A/2) advanced by lowering the compliance arm, then the set of frames is one cycle of operating the compliance roller. In this example, the cycle may start with the compliance arm raised, a scanning operation may be performed on half the film, the compliance arm may be lowered, the film may be advanced (by distance A/2), and the second half of the film in the spatial separator may be scanned. To process additional film, the film may be advanced and the compliance arm may be raised.

If the set of frames is not complete, the take up reel may be unlocked (step 480), the compliance arm may be lowered (step 490), and additional frames may be scanned (step 460). The set of frames then may be checked to see if additional incremental advancement by the compliance arm is required. That is, the scanning system determines whether additional portions of film in the sequence controlled by the locked reel need to be scanned.

If the set of frames is complete, the scanning process may be continued from step 410 to determine if the film is finished and/or to step 420 to advance the film to the desired frame.

Figure 5:
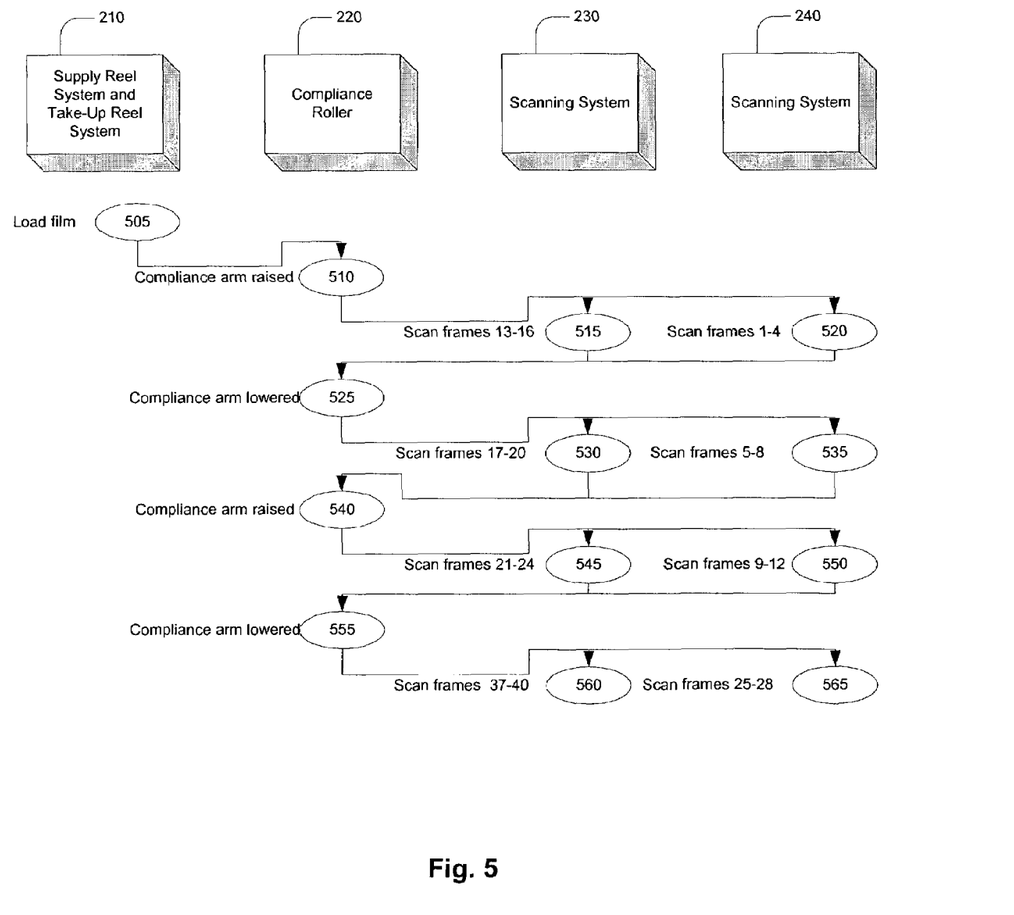
FIG. 5 is an exemplary flow chart showing a process used by a compound scanner to selectively scan in film.

Referring to FIG. 5, a flow chart 500 illustrates how a compound scanner, such as compound scanners 200 and 300 described with respect to FIGS. 2 and 3, may selectively scan film from the compound scanner. Generally, the operations described in flow chart 500 may be performed by the scanning systems described previously. However, the operations are not limited to being performed on the exemplary compound scanning systems described previously. For example, a compound scanning system may include two integrated scanning systems, with each integrated scanning system using three scanning heads. The operations in flow chart 500 may be extrapolated to support this system with six sensing heads.

Flow chart 500 is described with respect to a dual scanning head compound scanner that includes scanning system 230 and scanning system 240. The system also includes a supply and take up system 210 and a compliance roller 220. The supply and take up system 210 may relate to the supply reel system 210 and take up reel system 260 described previously, and may include a capstan (e.g., a gear and lock system) configured to enable the film to be selectively advanced. Similarly, the compound scanner may include a compliance roller 220, similar to the compliance roller 220 described previously, configured to incrementally advance film through the compound scanner.

In the example process illustrated by FIG. 5, the scanning systems are configured to scan four frames per scanning operation on each scanning system, with two scanning systems being used. Additionally, as was described in FIGS. 2 and 3, the compliance roller 220 is configured to advance four frames at a time when the compliance arm is lowered (with twelve frames between the first and second scanning systems to serve as the spatial separator or the reserve of unscanned frames).

Initially, the film is loaded (step 505). Loading the film may include ensuring the film and reel are secure in a frame (e.g., supply reel frame 214) and the film is calibrated so that the scanning system may recognize when to begin scanning. In some configurations, the scanning systems may include software to automatically recognize the boundaries between frames. In such a system, minimal calibration may be required. In other systems, the film may be precisely configured so that advancing the film places frame boundaries in an expected boundary position.

Loading the film may include configuring the supply and take up system 210 to coordinate film advancement with the compliance roller 220. For example, the supply and take up system 210 may be configured to selectively lock or release a reel in coordination with the movement of a compliance arm.

The compound scanning system may be configured in an initial configuration. With this initial configuration, the compliance arm in the compliance roller 220 may be raised (step 510). Generally, the compliance arm is configured to incrementally advance portions of film before the scanner. In the example shown, where the compliance arm is separated from the entry and exit rollers by half the distance between the spatial separator (e.g., A/2), lowering the compliance arm from an elevated position advances the film by a distance of A/2, where A is the distance of the spatial separator. In particular, raising the compliance arm pulls frames corresponding to a distance of A/2 from the supply reel and lowering the compliance arm advances the frames in the scanner by a distance of A/2.

Scanning system 230 scans frames 13-16 (step 515) and scanning system 240 scans in frames 1-4 (step 520). The compliance roller 220 lowers the compliance arm, which advances the frames into the scanning systems. Scanning system 230 then scans frames 17-20 (step 530) and scanning system 240 scans frames 5-8 (step 535). The compliance roller 220 then raises the compliance arm, which pulls more footage from the supply reel. Scanning system 230 scans frames 21-24 (step 545) while scanning system 240 scans frames 9-12 (step 550).

Next, the compliance roller 220 lowers the compliance arm (step 555). With the film advancing, scanning system 230 scans frames 37-40 (step 560) while scanning system 240 scans frames 25-28 (step 565).

Other implementations are within the scope of the following claims. In particular, the compound scanner may be configured to perform multiple scanning operations per frame or portion of film. For example, the scanning head may initially perform a scanning operation to determine the frame alignment. The image from this initial scanning operation may be analyzed to determine one or more frame parameters. These frame parameters then may be used to control subsequent scanning operations. For example, the frame parameters may be used to adjust the scanning process to compensate for color levels in the image.

The subsequent scanning operations may include scanning directed to one of three color or frequency bands. For example, one pass may perform low-resolution imaging, while a second pass performs medium resolution imaging, and a third performs high-resolution imaging.

What is claimed is:

1. A method of scanning a film, the method comprising:
   routing a film from a reel through two or more scanning systems;
   scanning the film in parallel using the scanning systems, such that the film is scanned using multiple scanning heads to capture multiple film frames simultaneously;
   creating a scanning operation dataset from outputs of the scanning systems; and
   transmitting the scanning operation dataset to a post-production processing switch that coordinates post-production processing on the scanning operation dataset.

2. The method of claim 1 wherein scanning the film in parallel comprises scanning the film in parallel using multiple scanning heads, with each scanning head being configured to create a portion of the scanning operation dataset from a single scanning operation of an image in a reel of film.

3. The method of claim 1 wherein scanning the film in parallel comprises scanning multiple frames in the film using a single scanning operation on a single scanning head.

4. The method of claim 1 further comprising saving the scanning operation data set after performing at least one post-production processing operation on the scanning operation dataset.

5. The method of claim 4 wherein the post-production processing operation comprises film and dirt cleanup processing.

6. The method of claim 4 wherein the post-production processing operation comprises resolution conversion.

7. The method of claim 4 wherein the post-production processing operation comprises color correction.

8. The method of claim 4 wherein performing the post-production processing operation includes initiating the post-production processing operation as the film is being scanned.

9. The method of claim 8 wherein initiating the post-production processing operation as the film is being scanned includes initiating the post-production processing on a frame in a set of frames while the set of frames is being scanned.

10. The method of claim 8 wherein initiating the post-production processing operation as the film is being scanned includes initiating the post-production processing on a portion of a frame while the frame is being scanned.

11. The method of claim 4 wherein performing the post-production processing operation includes completing the post-production processing operation while a portion of the film is being scanned.

12. The method of claim 11 wherein completing the post-production processing operation includes completing the post-production processing on a frame in a set of frames while the set of frames is being scanned.

13. The method of claim 11 wherein completing the post-production processing operation includes completing the post-production processing on a portion of a frame while the frame is being scanned.

14. The method of claim 4 wherein the post-production processing operation comprises registration.

15. The method of claim 4 wherein the post-production processing operation comprises performing special effects.

16. The method of claim 1 wherein routing the film through the scanning systems includes routing the film over a compliance roller configured to incrementally advance the film.

17. The method of claim 1 wherein routing the film through the scanning systems includes routing the film through a spatial separator configured to maintain a reserve of unscanned images for each of the scanning sensors.

18. The method of claim 17 further comprising incrementally advancing the film using a compliance arm in a compliance roller.

19. The method of claim 1 further comprising interfacing with a scanning controller that provides instructions for controlling the scanning system in scanning the film.

20. A film scanner comprising:
   a multiple image scanning platform structured and arranged to create a scanning operation dataset based on a single concurrent scanning operation of multiple images in a reel of film, wherein the multiple image scanning platform comprises multiple image sensors on a common transport configured to capture multiple film frames simultaneously; and
   a scanning controller structured and arranged to:
      control scanning operations comprising at least two concurrent scanning operations, where each scanning operation involves at least one image and at least one multiple image scanning platform, and
      transmit the scanning operation dataset to a post-production processing switch that coordinates post-production processing on the scanning operation dataset.

21. The film scanner of claim 20 wherein the scanning controller is structured and arranged to interface with a scanning manager managing more than one film scanner to transmit the scanning operation dataset to a film-processing device.

22. The film scanner of claim 20 wherein the scanning controller is structured and arranged to interface with a post-production processing switch.

23. The film scanner of claim 20 wherein the multiple image scanning platform comprises a group one scanner.

24. The film scanner of claim 20 further comprising a processor structured and arranged to perform post-production processing on the film.

25. The film scanner of claim 20 wherein the scanning controller is structured and arranged to transmit the scanning operation dataset in an IP format.

26. The film scanner of claim 20 wherein the post-production processing includes film and dirt cleanup.

27. The film scanner of claim 20 wherein the post-production processing includes color correction.

28. The film scanner of claim 20 wherein the post-production processing includes resolution conversion.

29. The film scanner of claim 20 wherein the post-production processing includes special effects.

30. The film scanner of claim 20 wherein the post-production processing includes registration.

31. A film scanner comprising:
   means for routing a film from a reel through two or more scanning systems;

means for scanning the film in parallel using the scanning systems, such that the film is scanned using multiple scanning means to capture multiple film frames simultaneously;

means for creating a scanning operation dataset produced by the scanning systems; and means for transmitting the scanning operation dataset to a post-production processing switch that coordinates post-production processing on the scanning operation dataset.

32. A method of scanning a film, the method comprising:
routing a film from a reel through two or more scanning systems;
scanning the film in parallel using the scanning systems;
creating a scanning operation dataset from outputs of the scanning systems; and
transmitting the scanning operation dataset to a post-production processing switch that coordinates post-production processing on the scanning operation dataset.

33. A method of scanning a film, the method comprising:
routing a film from a reel through two or more scanning systems, wherein routing the film includes routing the film over a compliance roller configured to incrementally advance the film;
scanning the film in parallel using the scanning systems;
creating a scanning operation dataset from outputs of the scanning systems; and
transmitting the scanning operation dataset to a post-production processing switch that coordinates post-production processing on the scanning operation dataset.

34. A method of scanning a film, the method comprising:
routing a film from a reel through two or more scanning systems, wherein routing the film includes routing the film through a spatial separator configured to maintain a reserve of unscanned images for each of the scanning sensors;
scanning the film in parallel using the scanning systems; and
creating a scanning operation dataset from outputs of the scanning systems.

35. The method of claim 34 further comprising incrementally advancing the film using a compliance arm in a compliance roller.

36. A method of scanning a film, the method comprising:
routing a film from a reel through two or more scanning systems;
scanning the film in parallel using the scanning systems; and
transmitting the scanning operation dataset to a post-production processing switch that coordinates post-production processing on the scanning operation dataset;
creating a scanning operation dataset from outputs of the scanning systems; and
saving the scanning operation data set after performing at least one post-production processing operation on the scanning operation dataset, wherein the post-production processing operation comprises at least one of film and dirt cleanup processing, resolution conversion, or color correction.

37. A method of scanning a film, the method comprising:
routing a film from a reel through two or more scanning systems;
scanning the film in parallel using the scanning systems;
creating a scanning operation dataset from outputs of the scanning systems;
transmitting the scanning operation dataset to a post-production processing switch that coordinates post-production processing on the scanning operation dataset; and
saving the scanning operation data set after performing at least one post-production processing operation on the scanning operation dataset, wherein performing the post-production processing operation includes initiating the post-production processing on a portion of a frame while the frame is being scanned.

38. A method of scanning a film, the method comprising:
routing a film from a reel through two or more scanning systems;
scanning the film in parallel using the scanning systems;
creating a scanning operation dataset from outputs of the scanning systems; and
transmitting the scanning operation dataset to a post-production processing switch that coordinates post-production processing on the scanning operation dataset;
performing, while a portion of a frame is being scanned, a post-production processing operation;
completing the post-production processing operation on the portion of the frame while the frame is being scanned;
saving the scanning operation data set after performing at least one post-production processing operation on the scanning operation dataset.

39. A method of scanning a film, the method comprising:
routing a film from a reel through two or more scanning systems;
scanning the film in parallel using the scanning systems;
creating a scanning operation dataset from outputs of the scanning systems;
transmitting the scanning operation dataset to a post-production processing switch that coordinates post-production processing on the scanning operation dataset
performing, in a post-production processing operation, registration;
saving the scanning operation data set after performing at least one post-production processing operation on the scanning operation dataset.

40. A method of scanning a film, the method comprising:
routing a film from a reel through two or more scanning systems;
scanning the film in parallel using the scanning systems;
creating a scanning operation dataset from outputs of the scanning systems;
transmitting the scanning operation dataset to a post-production processing switch that coordinates post-production processing on the scanning operation dataset;
performing, in a post-production processing operation, special effects; and
saving the scanning operation data set after performing at least one post-production processing operation on the scanning operation dataset.

41. A film scanner comprising:
a multiple image scanning platform structured and arranged to create a scanning operation dataset based on a single concurrent scanning operation of multiple images in a reel of film;
a scanning controller structured and arranged to control scanning operations comprising at least two concurrent scanning operations, where each scanning operation involves at least one image and at least one multiple image scanning platform, wherein the scanning controller is structured and arranged to interface with a post-production processing switch.

42. A film scanner comprising:
a multiple image scanning platform structured and arranged to create a scanning operation dataset based on a single concurrent scanning operation of multiple images in a reel of film; and
a scanning controller structured and arranged to control scanning operations comprising at least two concurrent scanning operations, where each scanning operation involves at least one image and at least one multiple image scanning platform, wherein the scanning controller is structured and arranged to transmit the scanning operation dataset in an IP format.

43. A film scanner comprising:
a multiple image scanning platform structured and arranged to create a scanning operation dataset based on a single concurrent scanning operation of multiple images in a reel of film; and
a scanning controller structured and arranged to control scanning operations comprising at least two concurrent scanning operations, where each scanning operation involves at least one image and at least one multiple image scanning platform, wherein the scanning controller is structured and arranged to transmit the scanning operation dataset to a post-production processing switch for post production processing before the scanning operation dataset is stored.

44. The film scanner of claim 43 wherein the post-production processing includes at least one of film and dirt cleanup, color correction, resolution conversion, special effects, or registration.

45. A method of scanning a film, the method comprising:
routing a film from a reel through two or more scanning systems, wherein routing the film through the scanning systems includes routing the film through a spatial separator configured to maintain a reserve of unscanned images for each of the scanning sensors;
scanning the film in parallel using the scanning systems, such that the film is scanned using multiple scanning heads to capture multiple film frames simultaneously; and
creating a scanning operation dataset from outputs of the scanning systems.

* * * * *

UNITED STATES PATENT AND TRADEMARK OFFICE
CERTIFICATE OF CORRECTION

| | | |
|---|---|---|
| PATENT NO. | : 7,379,215 B1 | Page 1 of 1 |
| APPLICATION NO. | : 10/330545 | |
| DATED | : May 27, 2008 | |
| INVENTOR(S) | : Gilbert G. Weigand, Paul R. Klamer and Christopher J. Cookson | |

It is certified that error appears in the above-identified patent and that said Letters Patent is hereby corrected as shown below:

Title page item (73) Assignee: after "Warner Bros. Entertainment, Inc., Burbank, CA (US)", please insert --Time Warner, Inc., New York, NY (US)-- and --AOL LLC, Dulles, VA (US)--.

Signed and Sealed this

Twenty-sixth Day of January, 2010

David J. Kappos
*Director of the United States Patent and Trademark Office*